United States Patent
Braman et al.

(10) Patent No.: US 7,531,019 B1
(45) Date of Patent: May 12, 2009

(54) HIGH AIR FLOW/POWER RATIO, SMALL FOOTPRINT, HOUSEHOLD ROOM AIR PURIFIER

(75) Inventors: Richard Braman, Anaheim, CA (US); Jack Nelson, Anaheim, CA (US)

(73) Assignee: HEPA Corporation, Anaheim, CA (US)

( * ) Notice: Subject to any disclaimer, the term of this patent is extended or adjusted under 35 U.S.C. 154(b) by 595 days.

(21) Appl. No.: 11/347,890

(22) Filed: Feb. 6, 2006

Related U.S. Application Data

(63) Continuation-in-part of application No. 11/299,039, filed on Dec. 9, 2005, now abandoned.

(60) Provisional application No. 60/635,073, filed on Dec. 9, 2004.

(51) Int. Cl.
*B01D 46/00* (2006.01)

(52) U.S. Cl. .............................. 55/471; 55/472; 55/505

(58) Field of Classification Search .................. 55/467, 55/471, 472, 502, 505
See application file for complete search history.

(56) References Cited

U.S. PATENT DOCUMENTS

| | | | |
|---|---|---|---|
| 3,341,689 A * | 9/1967 | Reichenbach | ............... 392/365 |
| 4,210,429 A | 7/1980 | Golstein | |
| 4,526,592 A | 7/1985 | Armbruster | |
| 5,453,049 A | 9/1995 | Tillman, Jr. et al. | |
| D399,942 S | 10/1998 | Carroll et al. | |
| D410,539 S | 6/1999 | Gutmann | |
| 6,174,340 B1 * | 1/2001 | Hodge | ....................... 55/385.1 |
| 6,267,793 B1 | 7/2001 | Gomez et al. | |
| D497,985 S | 11/2004 | Christianson | |

* cited by examiner

*Primary Examiner*—Robert A Hopkins
(74) *Attorney, Agent, or Firm*—Louis J. Bachand

(57) ABSTRACT

A maximum air flow, minimum space requirement household room air purifier comprising an enclosure arranged to stand on a room floor in a room corner formed by room walls and having a face opening toward the room, an arcuate air purifying HEPA filter, a motorized fan passing room air through said enclosure and said filter in room air purifying relation, and a filter unit comprising a frame carrying the filter for snug interfittment with the enclosure face opening. The filter frame is provided with a reversible self-latch for removably securing the filter to the face opening and a seal against unpurified air by-passing the filter.

18 Claims, 3 Drawing Sheets

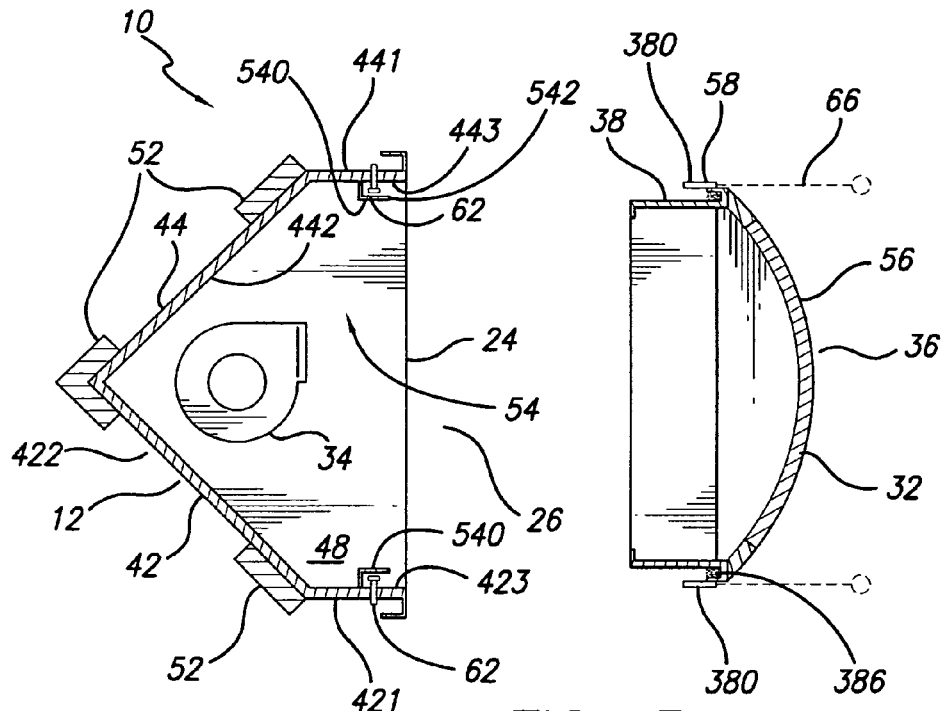
FIG. 3
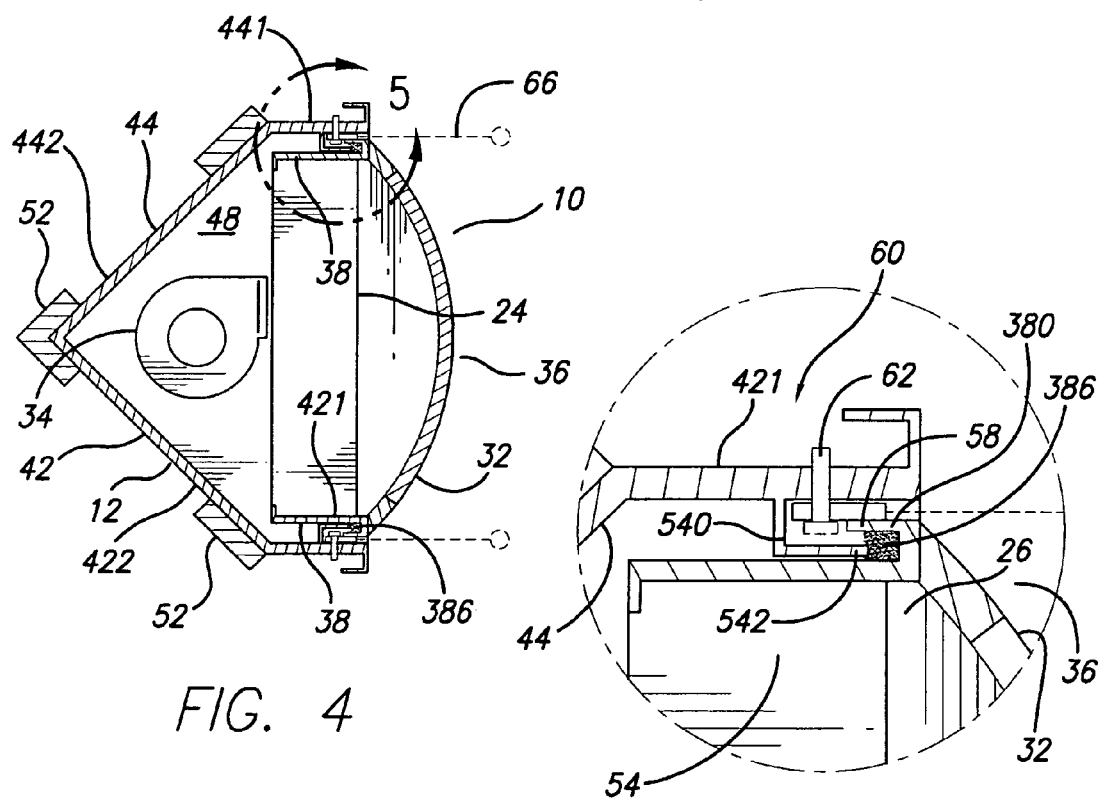
FIG. 4
FIG. 5

HIGH AIR FLOW/POWER RATIO, SMALL FOOTPRINT, HOUSEHOLD ROOM AIR PURIFIER

CROSS-REFERENCE TO RELATED APPLICATIONS

This application is a continuation in part of application Ser. No. 11/299,039, filed Dec. 9, 2005, now abandoned, which application claims the benefit of U.S. Provisional Application Ser. No. 60/635,073, filed Dec. 9, 2004.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to household room air purifiers of the type filtering room air to remove particulates down to very small sizes with efficiencies of 95% and more. More particularly, the invention relates to room air purifiers of a convenient quarter-round shape that will fit into a corner, that mount their own fans and motors, and that put out high volumes of air, in the hundreds of cubic feet per minute.

2. Description of the Related Art

Numerous household room air purifiers are known. Some incorporate so-called HEPA filters; others rely on electrostatic principles to separate unwanted particulate from the room air or use ozone generation to give a sense of fresh air. Continuing improvement efforts in known devices and a number of newly introduced devices signal that the best room air purifier is not yet found.

BRIEF SUMMARY OF THE INVENTION

It is an object of the invention to provide an improved home-type HEPA filter system. It is a further object to provide such a filter with maximized filter area through the use of an arcuate filter rather than rectangular, although a rectangular filter can be used at some loss in efficiency (cubic feet per minute of air vs. power in watts). It is a further object to provide such a filter shaped by filter unit walls disposed at about 90 degrees to enable fitting the filter into a room corner that is generally unused space. It is a further object to have removable filters that are within a frame that fits snugly into the main filter enclosure. A further object is to provide self-latching, "snap," reversible latches in spaced locations on the filter frame and on extensions of the filter sidewalls for ease of positively sealed positioning of successive filters in the enclosure receiving frame.

These and other objects of the invention to become apparent hereinafter are realized in a maximum air flow, minimum space requirement household room air purifier comprising an enclosure arranged to stand on a room floor in a room corner formed by room walls and having a face opening toward the room, a suitably arcuate air purifying filter, a fan passing room air through the enclosure and the filter in purifying relation, and a filter unit comprising a frame carrying the filter for snug interfittment with the enclosure face opening, the filter frame having a reversible self-latch for securing the filter unit at the face opening.

In this and like embodiments, typically, the enclosure is defined by angularly opposed side walls extending between upper and lower end walls and arranged to fit closely in the room corner, the enclosure has at least one spacer carried by a sidewall against a too close approach of the sidewall to the room walls, the enclosure face opening defines a purified air outlet, the enclosure having at least one room air inlet spaced from the outlet, the enclosure sidewall defines the at least one inlet adjacent the spacer, the enclosure comprises vertical right and left sidewalls that are disposed at an angle to each other and generally parallel with room walls opposite, the upper and lower end walls supporting the disposition of the sidewalls, and the filter being arcuate and subtending the angle, the sidewalls each have air inlet openings therein and carry spacers against too close proximity to the room walls, the enclosure has sidewalls with forwardly projecting extensions angled to the balance of the sidewalls and parallel to each other that with upper and lower end walls define a receiving frame about the enclosure face opening, the filter being arcuate in horizontal cross section, the filter unit frame having parallel walls and a rectangular cross-section sized to fit closely within said receiving frame; the enclosure sidewalls each have forwardly projecting extensions angled to the balance of the sidewalls and parallel to each other that with the upper and lower endwalls define a receiving frame about the enclosure face opening, the receiving frame having parallel walls and a rectangular cross-section, the filter unit frame has parallel walls and a rectangular cross-section to be congruent with and fit snugly within the enclosure receiving frame with the filter unit arcuate filter projecting into the room, the reversible self-latch comprises a cooperating latch hook and pin arrangement, the enclosure receiving frame carries the latch pin, the latch hook is carried in pin pivotally deflectable relation on the filter unit frame, and the latch hook is reversibly spring biased into latching engagement with the pin, and typically the receiving frame carries on its inward faces a flange defining a knife edge, and the filter unit frame carries a trough adapted to receive the knife edge in sealing relation against unpurified air passing the filter.

In a highly particular embodiment, the invention provides a maximum air flow, minimum space requirement household room air purifier comprising an enclosure arranged to stand on a room floor in a room corner formed by room walls and having a face opening defining a purified air outlet open toward the room and an air inlet, an arcuate air purifying HEPA filter, a motorized fan drawing room air into the enclosure from the inlet and expelling the room air out of the enclosure through the filter outlet in room air purifying relation, and a filter unit comprising the filter and a frame carrying the filter for snug interfittment with the enclosure face opening, the enclosure being defined by angularly opposed side walls extending at about 90 degrees to each other and generally parallel with the room walls and defining the air inlet between upper and lower end walls and arranged to fit closely in the room corner, the filter subtending the angle, at least one spacer carried by a sidewall against a too close approach of the sidewall to the room walls against blocking of the air inlet, the enclosure sidewalls each having forwardly projecting extensions angled to the balance of the sidewalls and parallel to each other that with the upper and lower endwalls define a receiving frame about the enclosure face opening, the receiving frame having parallel walls and a rectangular cross-section, the filter unit frame having parallel walls and a rectangular cross-section to be generally congruent with and fit snugly within the enclosure receiving frame with the filter unit arcuate filter projecting into the room, a reversible self-latch for removably securing the filter unit to the enclosure receiving frame, the self-latch comprising a cooperating latch hook and pin arrangement in which the enclosure receiving frame carries the latch pin, the latch hook is carried in pin pivotally deflectable relation on the filter unit frame and the latch hook is reversibly spring biased into latching engagement with the pin following deflection. In this embodiment, too, the receiving frame carries on its inward faces a flange defining a knife edge to be received in a trough carried by the filter unit frame in sealing relation.

BRIEF DESCRIPTION OF THE SEVERAL VIEWS OF THE DRAWINGS

The invention will be further described in conjunction with the attached drawings in which:

FIG. 3 is view taken on line 3-3 in FIG. 2

FIG. 4 is a view like FIG. 3 of the assembled room air purifier, and

FIG. 5 is a view taken on line 5 in FIG. 4.

DETAILED DESCRIPTION OF THE INVENTION

Figure 1:
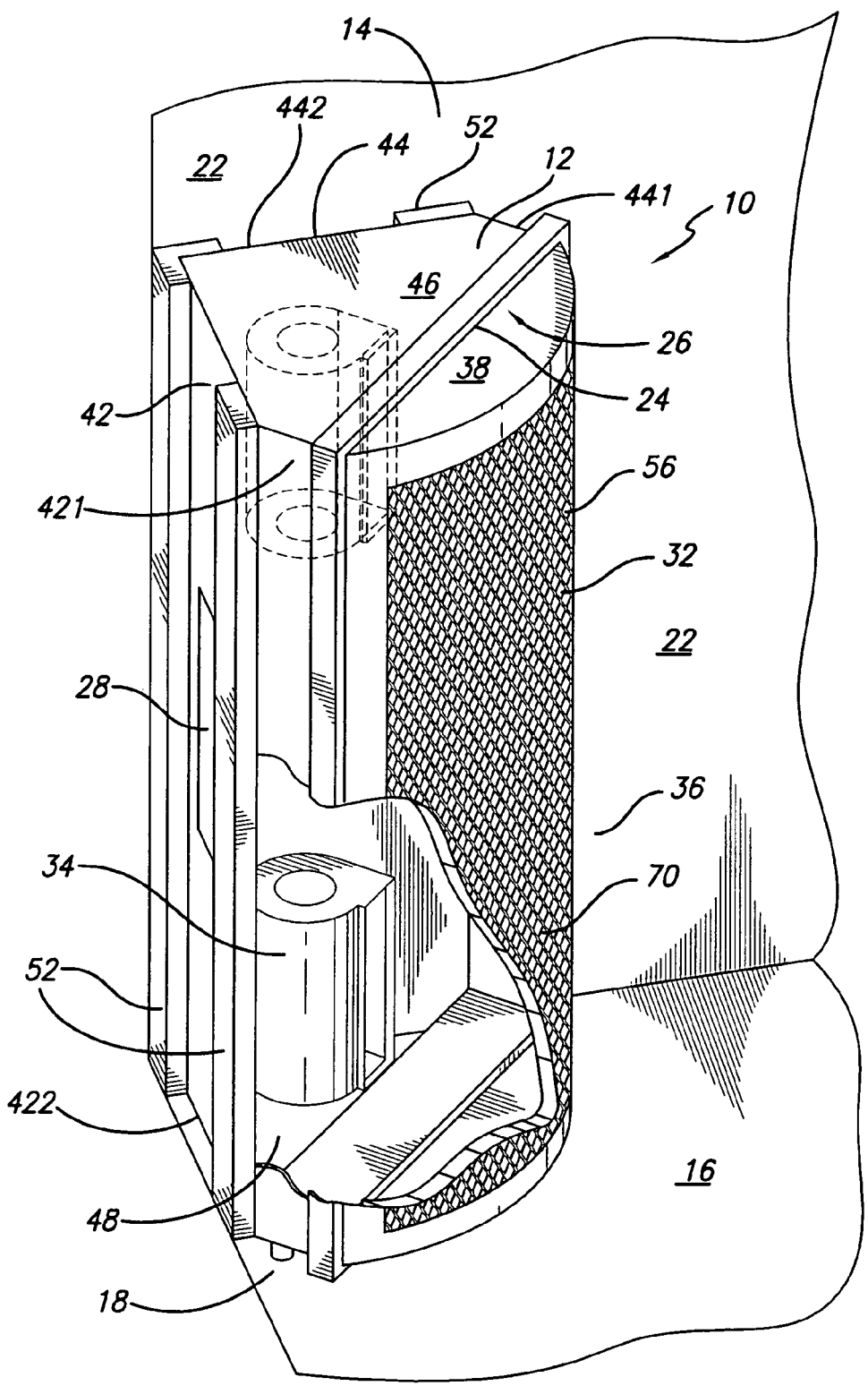
FIG. 1 is a perspective view of the invention room air purifier.
Figure 2:
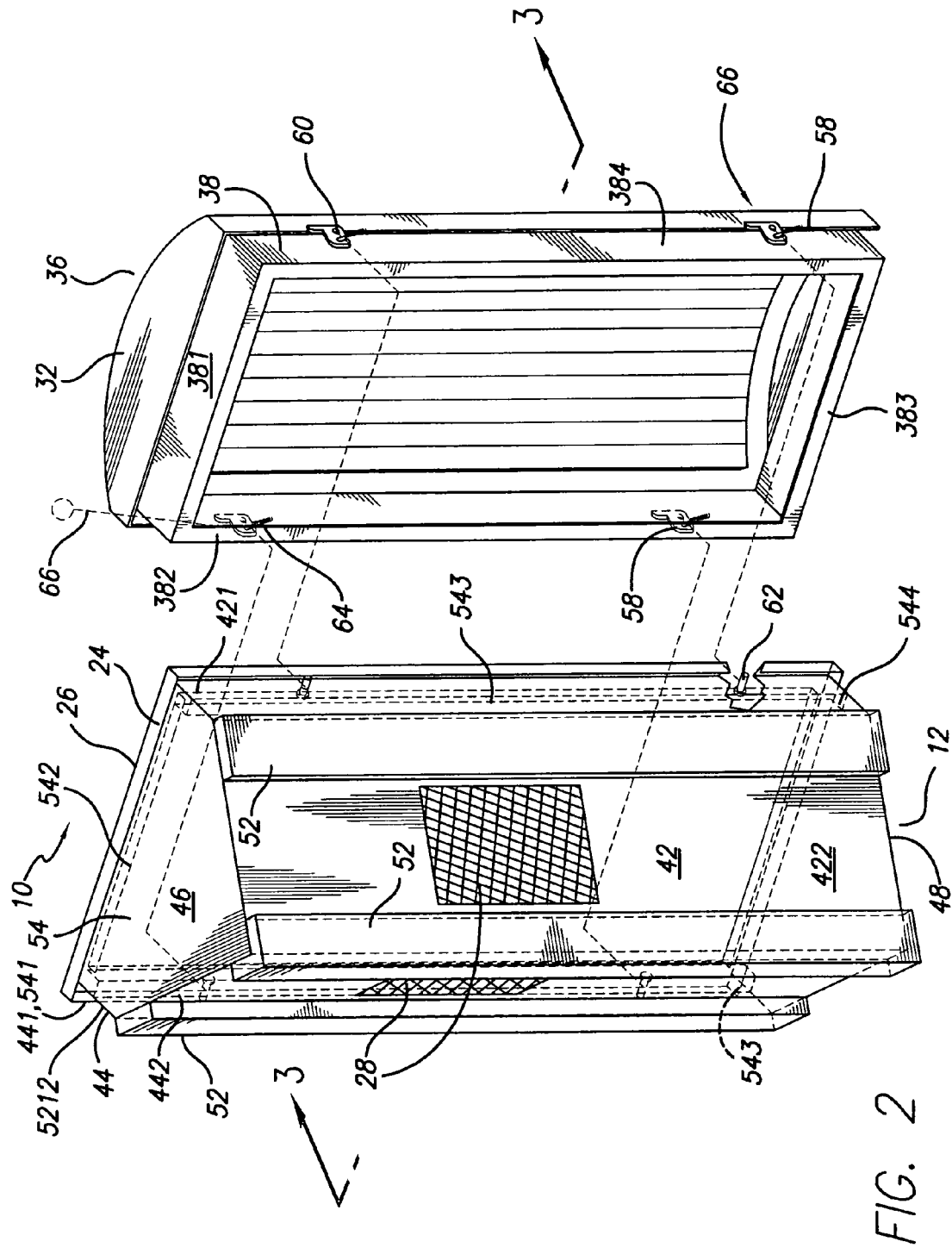
FIG. 2 is an exploded perspective view of the room air purifier of FIG. 1.

With reference now to the drawings in detail, in FIGS. 1-3 a maximum air flow, minimum space requirement household room air purifier is shown at 10 and comprises an enclosure 12 arranged to stand in a room 14 on a room floor 16 in a room corner 18 formed by room walls 22. Enclosure 12 has a face opening 24 defining a purified air outlet 26 open toward the room 14 and at least one air inlet 28. An arcuate air purifying HEPA filter 32 is provided at the enclosure face opening 24. One or more motorized fans 34 draw room air into the enclosure 12 from the inlets 28 and expelling the room air out of the enclosure through the filter outlet 26 in room air purifying relation.

A replaceable filter unit 36 comprises the filter 32 and a frame 38 that supports and carries carrying the filter. Frame 38 is sized and shaped for snug interfittment with the enclosure face opening 24.

Typically, the enclosure 12 face opening 24 is defined by angularly opposed side walls 42, 44 extending at about 90 degrees to each other and respectively generally parallel with the room walls 22 of corner 18. Sidewalls 42, 44 define the air inlets 28 between upper and lower end walls 46, 48 and are arranged to fit closely in the room corner 18. Arcuate filter 32 subtends the angle of sidewalls 42, 44. At least one spacer 52 is carried by a sidewall 42, 44 against a too close approach of the sidewall to the room walls 22 such that the inlets 28 are not blocked by their proximity to the walls 22.

Preferably, the enclosure sidewalls 42, 44 each have forwardly projecting extensions 421, 441 angled to the balance 422, 442 of the sidewalls and parallel to each other, as shown, that with the upper and lower endwalls 46, 48 define a receiving frame 54 about the enclosure face opening 24. Receiving frame 54 has parallel walls 541, 542, 543, 544 and a rectangular cross-section. The filter unit frame 38 has parallel walls 381, 382, 383, and 384 and a rectangular cross-section shaped and sized to be generally congruent with and fit snugly within the enclosure receiving frame 54 with the filter unit arcuate filter face 56 projecting into the room 18. Prefilters and sound reducing baffles can be used within the enclosure as can air modification expedients such as humidifiers as desired.

An added feature of the invention is the use of effective sealing between the filter unit frame 38 and receiving frame 54. As shown receiving frame 54 carries on its wall inward faces 423, 443 a rectangular flange 540 that defines a first sealing member in the form of a knife edge 542. Correspondingly, filter unit frame 38 carries a second sealing member comprising a rectangular trough 380 into which the knife edge 542 is received when the filter unit frame 38 is fully within the receiving frame 54 against unpurified air flow past the filter 32. A seal material 386 can be disposed between within the trough 380, suitably resilient such as an elastomer, or a self-sealing material such as a viscous gel, to ensure adequate sealing of the frames 38, 54 together.

A reversible self-latch 60 for removably securing the filter unit 36 to the enclosure receiving frame 54 in sealed condition is provided comprising a cooperating latch hook 58 and pin 62 arrangement. The enclosure receiving frame 54 carries the latch pin 62 and the latch hook 58 is carried in pin pivotally deflectable relation on the filter unit frame 38; the latch hook is reversibly spring biased by spring 64 (having a pull-tether 66 for reversing the spring bias and unlatching the latch) into latching engagement with the pin following deflection. See U.S. Pat. No. 6,267,793, the disclosure of which is hereby incorporated herein for an example of a suitable latching structure 60.

The arcuate shape of the filter 32 provides greater filter area and flow capacity for a given housing dimension, e.g. with a 24 inch radius filter, than a rectangular filter, providing greater filtration in a given space and higher CFM's, The invention room air purifier 10 is preferably shaped as corner unit that takes up room space probably not otherwise used, is of a height, e.g. 36 inches, to double as an end table or nightstand in a bedroom, and presents an attractive grill face 70 to the room.

The invention thus provides an improved home-type HEPA filter system with maximized filter area through the use of an arcuate filter rather than rectangular, the filter being shaped by walls at about 90 degrees to enable fitting the filter into a room corner that is generally unused space. The removable filters are carried within a frame that fits snugly into the main filter enclosure. Self-latching, "snap," reversible latches are placed in spaced locations on the filter frame and extensions of the filter sidewalls for ease of positively sealed positioning of successive filters in the enclosure receiving frame.

The foregoing objects are thus met.

We claim:

1. A maximum air flow, minimum space requirement household room air purifier, said air purifier comprising an enclosure comprising a receiving frame arranged to stand on a room floor in a room corner formed by room walls and having defined by said receiving frame a face opening toward said room, an air purifying filter, a fan passing room air through said enclosure and said filter in purifying relation, and a filter unit comprising a frame carrying said filter for snug interfittment with said receiving frame and enclosure face opening, said filter frame having a reversible self-latch for securing said filter unit at said face opening, said filter being arcuate in horizontal cross section, said filter unit frame having parallel walls and a rectangular cross-section sized to fit closely within said receiving frame.

2. The maximum air flow, minimum space requirement household room air purifier according to claim 1, in which said enclosure is defined by angularly opposed side walls extending between upper and lower end walls and arranged to fit closely in said room corner.

3. A maximum air flow, minimum space requirement household room air purifier, said air purifier comprising an enclosure arranged to stand on a room floor in a room corner formed by room walls and having a face opening toward said room, an air purifying filter, a fan passing room air through said enclosure and said filter in purifying relation, and a filter unit comprising a frame carrying said filter for snug interfittment with said enclosure face opening, said filter frame having a reversible self-latch for securing said filter unit at said face opening said enclosure being defined by angularly opposed side walls extending between upper and lower end walls and arranged to fit closely in said room corner, said enclosure having at least one spacer carried by a sidewall against a too close approach of said sidewall to said room walls.

4. The maximum air flow, minimum space requirement household room air purifier according to claim 3, in which said enclosure face opening defines a purified air outlet, said enclosure having at least one room air inlet spaced from said outlet.

5. The maximum air flow, minimum space requirement household room air purifier according to claim 4, in which a said enclosure sidewall defines said at least one inlet adjacent said spacer.

6. The maximum air flow, minimum space requirement household room air purifier according to claim 3, in which said enclosure comprises vertical right and left sidewalls that are disposed at an angle to each other and generally parallel with room walls opposite, said upper and lower end walls supporting the disposition of said sidewalls, and said filter being arcuate and subtending said angle.

7. The maximum air flow, minimum space requirement household room air purifier according to claim 3 in which said sidewalls each have air inlet openings therein and carry spacers against too close proximity to said room walls.

8. The maximum air flow, minimum space requirement household room air purifier according to claim 7, in which said enclosure sidewalls each have forwardly projecting extensions angled to the balance of said sidewalls and parallel to each other that with said upper and lower endwalls define a receiving frame about said enclosure face opening, said receiving frame having parallel walls and a rectangular cross-section.

9. The maximum air flow, minimum space requirement household room air purifier according to claim 8, in which said filter unit frame and enclosure receiving frame has parallel walls and a rectangular cross-section to be congruent with and fit snugly within said enclosure receiving frame with said filter unit arcuate filter projecting into said room.

10. The maximum air flow, minimum space requirement household room air purifier according to claim 9, in which said reversible self-latch comprises a cooperating latch hook and pin arrangement.

11. The maximum air flow, minimum space requirement household room air purifier according to claim 10, in which said enclosure receiving frame carries said latch pin.

12. The maximum air flow, minimum space requirement household room air purifier according to claim 11, in which said latch hook is carried in pin pivotally deflectable relation on said filter unit frame.

13. The maximum air flow, minimum space requirement household room air purifier according to claim 12, in which said latch hook is reversibly spring biased into latching engagement with said pin.

14. The maximum air flow, minimum space requirement household room air purifier according to claim 12, in which said receiving frame carries on its inward faces a flange defining a knife edge, and said filter unit frame carries a trough adapted to receive said knife edge in sealing relation.

15. A maximum air flow, minimum space requirement household room air purifier, said air purifier comprising an enclosure arranged to stand on a room floor in a room corner formed by room walls and having a face opening toward said room, an air purifying filter, a fan passing room air through said enclosure and said filter in purifying relation, and a filter unit comprising a frame carrying said filter for snug interfittment with said enclosure face opening, said filter frame having a reversible self-latch for securing said filter unit at said face opening, said enclosure having sidewalls with forwardly projecting extensions angled to the balance of said sidewalls and parallel to each other that with upper and lower endwalls define a receiving frame about said enclosure face opening, said filter being arcuate in horizontal cross section, said filter unit frame having parallel walls and a rectangular cross-section sized to fit closely within said receiving frame.

16. The maximum air flow, minimum space requirement household room air purifier according to claim 15, in which said receiving frame and said filter unit frame carrying cooperating sealing members against unpurified air flow past said filter.

17. A maximum air flow, minimum space requirement household room air purifier, said air purifier comprising an enclosure arranged to stand on a room floor in a room corner formed by room walls and having a face opening defining a purified air outlet open toward said room and an air inlet, an arcuate air purifying HEPA filter, a motorized fan drawing room air into said enclosure from said inlet and expelling said room air out of said enclosure through said filter outlet in room air purifying relation, and a filter unit comprising said filter and a frame carrying said filter for snug interfittment with said enclosure face opening, said enclosure being defined by angularly opposed sidewalls extending at about 90 degrees to each other and generally parallel with said room walls and defining said air inlet between upper and lower end walls and arranged to fit closely in said room corner, said filter subtending said angle, at least one spacer carried by a sidewall against a too close approach of said sidewall to said room walls against blocking of said air inlet, said enclosure sidewalls each having forwardly projecting extensions angled to the balance of said sidewalls and parallel to each other that with said upper and lower endwalls define a receiving frame about said enclosure face opening, said receiving frame having parallel walls and a rectangular cross-section, said filter unit frame having parallel walls and a rectangular cross-section to be generally congruent with and fit snugly within said enclosure receiving frame with said filter unit arcuate filter projecting into said room, a reversible self-latch for removably securing said filter unit to said enclosure receiving frame, said self-latch comprising a cooperating latch hook and pin arrangement in which said enclosure receiving frame carries said latch pin, said latch hook is carried in pin pivotally deflectable relation on said filter unit frame and said latch hook is reversibly spring biased into latching engagement with said pin following deflection.

18. The maximum air flow, minimum space requirement household room air purifier according to claim 17, in which said receiving frame carries on its inward faces a flange defining a knife edge, and said filter unit frame carries a trough adapted to receive said knife edge in sealing relation.

\* \* \* \* \*